United States Patent [19]

Chou et al.

[11] Patent Number: 4,764,278
[45] Date of Patent: Aug. 16, 1988

[54] PROCESS FOR REDUCING THE CONCENTRATION OF HALOORGANIC COMPOUNDS IN WATER

[75] Inventors: Charles C. Chou; Joseph J. Gentempo, both of Houston, Tex.

[73] Assignee: Shell Oil Company, Houston, Tex.

[21] Appl. No.: 932,823

[22] Filed: Nov. 20, 1986

[51] Int. Cl.$^4$ .............................................. B01D 11/04
[52] U.S. Cl. ................................... 210/634; 210/748; 210/909
[58] Field of Search ............... 210/909, 748, 908, 639, 210/634

[56] References Cited

U.S. PATENT DOCUMENTS 4,287,038  9/1981  Geiser et al. .................... 210/748 X
4,401,570  8/1983  Blytas et al. .................... 210/909 X

OTHER PUBLICATIONS

Nakada, M. et al., Photochemical Dehalogenation of Polyhalobenzenes, Bull. Chem. Soc., Japan 56: pp. 2447-2451 (1983).

Nakada, Jr. et al., Photochemical Dehalogenation of Polyhalobenzenes, I. Bull. Chem. Soc., Japan 56: pp. 2447-245 (1983).

Primary Examiner—Frank Spear
Attorney, Agent, or Firm—Ronald R. Reper

[57] ABSTRACT

A method and apparatus for reducing the concentration of haloorganic compounds in water-contaminated with haloorganic compounds is disclosed. The haloorganic compounds are extracted from the water and concentrated into certain water immiscible alkane hydrocarbon solvent. The solvent is separated from the water, is regenerated by ultraviolet radiation to degrade the haloorganics, and is recirculated to contact additional contaminated water. After extraction the water separated from the solvent may be subjected to conventional drinking water treatment, or passed to groundwater.

13 Claims, 1 Drawing Sheet

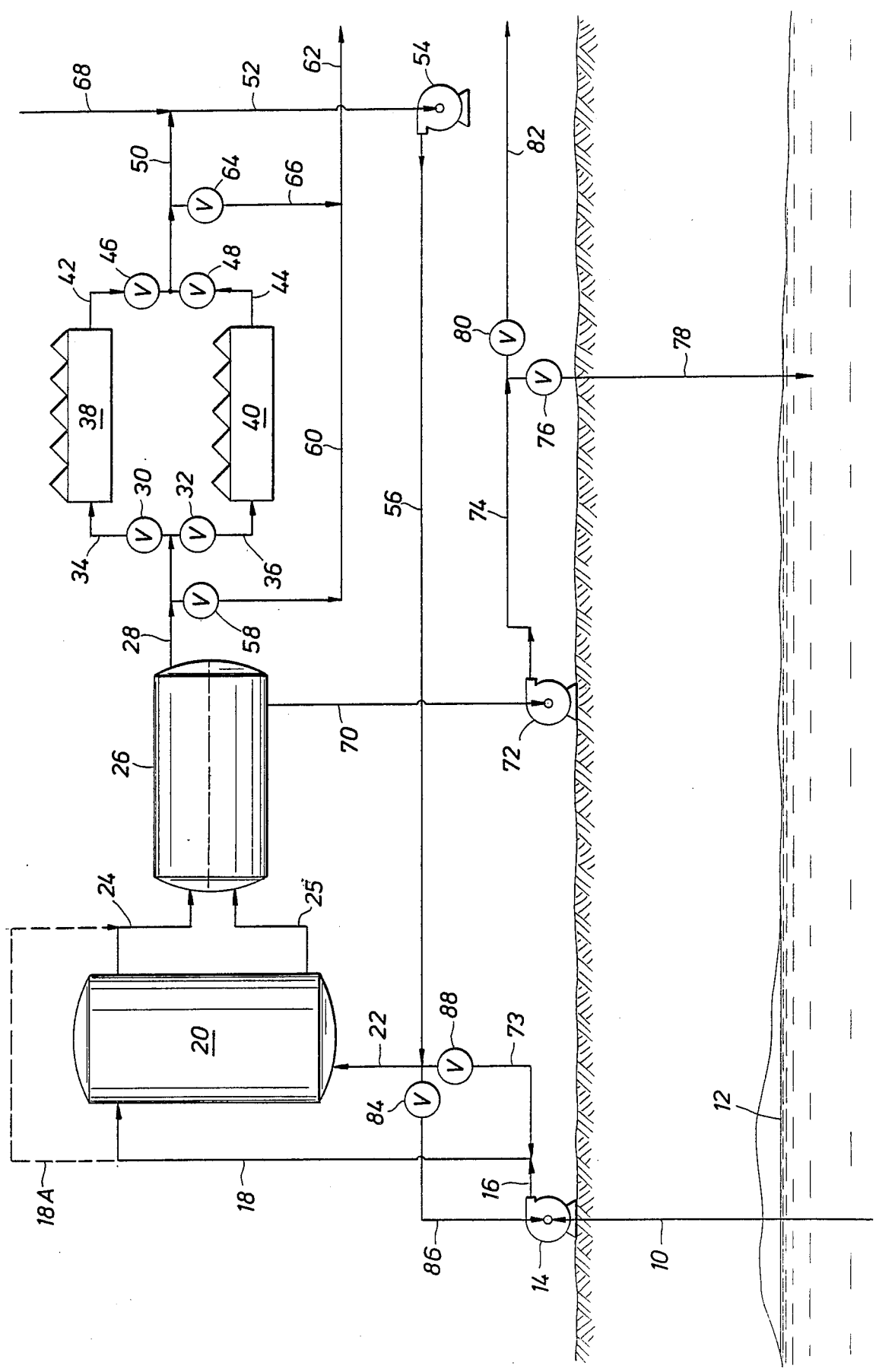

PROCESS FOR REDUCING THE CONCENTRATION OF HALOORGANIC COMPOUNDS IN WATER

BACKGROUND OF THE INVENTION

This invention provides a process for reducing the amount of haloorganic compounds in water. The invention may be usefully applied to any catchment of water and is particularly useful for the recovery of potable water from groundwater which has become contaminated by pesticidal haloorganic compounds. Such contamination may occur, for example, from agricultural run-off, or from accidental discharge of such compounds into the water-collecting system of an aquifer.

The contamination of underground water with agricultural chemicals was once considered unlikely, but there is mounting evidence that it is now occurring in wide areas of America. It was formerly thought that pesticidal residues would adhere to soil particles, and disappear naturally before they could significantly contaminate the groundwater. However, it has been found that for many agricultural chemicals instead of clinging to the soil at the surface, they percolate rapidly into underground water-bearing formations. No one knows what effect, if any, the generally low levels of, e.g., pesticides may have on human and farm animal health, but there is concern among environmentalists that there is insufficient experience to be assured that no problem exists.

Among the 500 or so known pesticides, about 90 are haloorganic compounds having wide utility, i.e. for controlling household and agricultural pests. Halogenated aliphatic compounds such as mixtures containing 1,3 dichloropropene, 1,2 dichloropropane, and/or dibromochloropropane have proven effective as soil fumigants to control, e.g. nematodes; halocyclodiene compounds marketed under tradenames such as Chlordane, Dieldrin, and Aldrin have been used to control e.g., cockroaches, ants, termites and other household pests, soil insects and many pests of vegetable and field crops; however such usage is now severely regulated.

Some widely used halogenated organic solvents such as trichloroethylene and carbon tetrachloride are also identified as organic contaminants in ground waters where leaks or spills from industrial sources have occurred.

Generally, pesticidal haloorganic compounds are only poorly soluble in water and are resistant to natural degradation in groundwater. Accordingly contamination of groundwater, although typically in very low concentration of a few parts per million, depending upon the particular haloorganic compound and on local conditions may persist for months, and possibly years. A method to expedite biotreatment of halogenated hydrocarbons is disclosed in U.S. Pat. No. 4,401,569, however, this is still time consuming and may not be suitable where the contaminated water is needed for immediate use.

It is known from U.S. Pat. No. 4,401,570 to remove organic contaminants from alkaline wastewater by a combination of acidification and extraction with a $C_5$-$C_{10}$ hydrocarbon, however, the addition of chemicals for acidification and neutralization may be undesirable, particularly where potable water is required.

It has been proposed to extract chlorinated hydrocarbons from water into hydrocarbon solvents such as undecane and kerosene, however, the relatively high solubility of such solvents in water results that the residual solvent remaining in the water after extraction would be at undesirably high levels where potable water is needed. Further the typically substantial aromatic content of most kerosene would be objectionable under the regulations of many state jurisdictions. In addition to having a favorable equilibrium distribution coefficient for the pesticidal haloorganic compounds, a solvent is needed which would have excellent transparency and stability under the conditions of regeneration to enable reuse of the solvent, and permit continuous operation. Such a solvent, process and apparatus to carry it out have now been found.

SUMMARY OF THE INVENTION

According to the invention there is provided a process for reducing the concentration of haloorganic compounds in water containing-haloorganics which comprises, (a) extracting said water in an extraction zone at a temperature from about 1° C. to about 50° C. with a hydrocarbon solvent consisting essentially of $C_{12}$ to $C_{20}$ alkane hydrocarbons, at least 60% of which are $C_{14}$ and above, to obtain (1) a fat solvent extract containing said haloorganics, and (2) water having reduced concentration of said haloorganics, (b) subjecting said fat solvent extract to ultraviolet radiation in a photodegradation zone to photodegrade said haloorganics, resulting in a lean solvent having reduced concentration of haloorganics, (c) recycling said lean solvent to the extraction zone of step (a), and (d) withdrawing water having reduced concentration of haloorganics from said extraction zone.

The process is carried out by apparatus which comprises (a) means for supplying water contaminated with at least one haloorganic compound;

(b) means for extracting said supplied water with a water immiscible $C_{12}$ to $C_{20}$ alkane hydrocarbon solvent, said means having a fluid inlet connection to said means for supplying water, a fluid solvent inlet, and at least one fluid outlet for extracted water and/or solvent;

(c) means for regenerating solvent by irradiation from an ultra-violet light source to photodegrade the haloorganic compounds, said means for regenerating having a fluid inlet connection to said means for extracting, and (d) means for recirculating solvent, operatively connected to circulate solvent from said means for regenerating solvent to said means for extracting.

BRIEF DESCRIPTION OF THE DRAWING

The FIGURE is a flow diagram of an illustrative embodiment according to the invention.

DESCRIPTION OF PREFERRED EMBODIMENTS

The present invention provides an improved method for removal of practically all of the haloorganics present in water contaminated with haloorganics. The purified water can then be rendered hygenic by irradiation or other conventional treatment for use as drinking water, or can be passed to groundwater or other storage for future use. The term "haloorganics" herein means compounds containing atoms of at least carbon, and a halogen. The invention is usefully applied to compounds containing fluorine, chlorine and/or bromine.

There appear to be few if any iodine-containing pesticidal haloorganics of concern.

A large number of haloorganic compounds have been used in agriculture to control pests. Exemplary are DDT which is 1,1,1-trichloro-bis(p-chlorophenyl)ethane and analogs such as 1,1-Dichloro-2,2(p-chlorophenyl)ethane; 1,1-dichloro-2,2-(p-ethylphenyl)ethane; 1,1,1-trichloro-2,2-bis(p-methoxyphenyl)ethane; 1,1-bis(p-chlorophenyl)-2-nitropropane; 1,1-bis(p-chlorophenyl)-2-nitrobutane and 1,1,1-trichloro-2,2-bis(p-fluorophenyl)ethane.

Benzene hexachloride, particularly its active ingredient gamma-1,2,3,4,5,6-hexachlorocyclohexane has been used extensively as a soil poison and for insect control.

Chlorinated naturally occurring terpenes such as camphene and pinene are used for pests of cotton and field crops. Halogen-containing insecticidal phosphates include 2,2 dichlorovinyl dimethyl phosphate and 2-chloro-1-(2,4-dichlorophenyl) vinyl diethyl phosphate.

Effective insecticides are chlorocyclodiene hydrocarbons, particularly polychlorinated cyclic hydrocarbons with endomethylene-bridged structures. Exemplary are the alpha-trans and beta-cis isomers of 2,3,4,5,6,7,8,8-Octachloro-2,3,3a,4,7,7a,-hexahydro-4,7-methanoindene; 1,4,5,6,7,8,8-Heptachloro-3a,4,7,7a-tetrahydro-4,7-methanoindene; 1,3,4,5,6,7,8,8-Octachloro-3a,4,7,7a-tetrahydro-4,7-methanophthalan; 1,2,3,4,10,10-Hexachloro-1,4,4a,5,8,8a-hexahydro-1,4-endo-exo-5,8-dimethanonaphthalene and the 6,7 epoxy derivative thereof, and the epoxy endo-endo derivative, namely 1,2,3,4,10,10-Hexachloro-6,7-epoxy-1,4,4a,5,6,7,8,8a-octahydro-1,4-endo-endo-5,8-dimethanonaphthalene. Additionally 6,7,8,9,10,10-Hexachloro-1,5,5a,6,9,9a-hexahydro-6,9-methano-2,4,3-benzodioxathiepin-3-oxide; 1,2,3,4,7,7-Hexachloro-5,6-bis(-chloromethyl)bicyclo-[2,2,1]-2-heptene; 1,2,3,4,5,5,6,7,8,9,10,10-dodecachloro-octahydro-1,3,4-methano-2H-cyclobuta-[c,d]-pentalene, and its' 2-keto derivative.

A number of chloroaliphatic hydrocarbons have been used as fumigants including 1,2-Dibromo-3-chloropropane; 1,2-Dichloropropane; Ethylene chlorobromide; Methyl bromide and Trichloroethylene.

Halogen-containing synthetic pyrethroids include compounds such as alpha-cyano(3-phenoxy-benzyl) 2-(4-chlorophenyl)-3-methyl butanoate and alphacyano-3-phenoxybenzyl 2-(2,2-dichlorovinyl)-3,3-dimethyl cyclopropane carboxylate; alpha-cyano-3-phenoxybenzyl alpha-isopropyl(p-(difluoromethoxy)phenyl)acetate; and alpha-cyano-3-phenoxybenzyl(1R,cis)-3-(1,2-dibromo-2,2-dichloroethyl)-2,2-dimethylcyclopropanecarboxylate.

According to the invention, the haloorganic compound content in contaminated water can be reduced to negligible amounts by treating a stream of said water with an alkane hydrocarbon solvent of $C_{12}$ to $C_{20}$ hydrocarbons, wherein at least about 60% by weight of the hydrocarbons are $C_{14}$ and higher. Representative of the alkane hydrocarbons in the solvent mixture are n-Dodecane; 2,4,4,7-Tetramethyloctane; 3,6-Diethyloctane; 2,3,5-Trimethyl-1-isopropylcyclohexane; 5-Butylnonane; 2,4-Dimethyl-2-cyclohexylpentane; Tridecane; 5-Methyldodecane; 3,8-Diethyldecane; Tetradecane; 5-Ethyl-5-butylnonane; Pentadecane; Cyclohexadecane; Hexadecane; Heptadecane; 5,5-Dibutylnonane; 4,9-Diisopropyldodecane; Octadecane; 7-Hexyltridecane; 9,10-Dimethyloctadecane; Cyclohexyltridecane; and 3-Ethyloctadecane and the like. Particularly preferred are $C_{14}$–$C_{18}$ hydrocarbons and mixtures thereof, especially those containing at least about 75% volume of $C_{14}$ alkanes, especially n-Hexadecane. The solvent will have very low solubility in water of less than about 5, preferably less than about 2 parts per billion by weight(ppbw), i.e. less than $2 \times 10^{-9}$ parts by weight in water at 25° C. The solubility of n-Hexadecane in water is about 0.9 ppbw at 25° C.

The liquid-liquid extraction may utilize co-current flow, but preferably employs counter-current flow. In a preferred embodiment the extraction is conducted in two stages with intermediate separation of the fat, i.e. haloorganics-rich, hydrocarbon solvent. Although it is possible to employ a different hydrocarbon for each extraction stage, for simplicity and ease of separation, use of a single hydrocarbon solvent composition, e.g. substantially n-Hexadecane is preferred.

The ratio at which the hydrocarbon solvent and water are employed in the extraction step(s) have an effect on the overall efficiency of the system. The preferred ratio will depend upon the particular haloorganic contaminant(s), particular hydrocarbon, and mixing efficiency, but may be readily determined by experimentation. Generally, volume ratios in the range from about 0.01:1 to about 10:1 are suitable, with volume ratios in the range from about 0.1:1 to 1:1 being preferred.

The process according to the invention may suitably reduce the content of haloorganic compounds to below about 10 parts per billion by weight(ppbw). Generally the process will not be applied to water containing more than about 100 parts per million by weight of haloorganics.

Reference will now be made in detail to an embodiment of the invention illustrated in the accompanying drawing, which embodiment is particularly adapted for reducing the amount of haloorganic compounds in contaminated groundwater. The apparatus or system comprises means for supplying water, pipe 10 which provides a conduit that extends from the ground surface through a boring through the soil and extends below the surface 12 of the water table into the contaminated groundwater. When applying this invention to contaminated water arising from a localized spill, the supply means will ordinarily be positioned to remove contaminated water from a diverting trench (not shown) which is dimensioned and positioned to remove substantially all of the water flowing through the area of the ground which contains the contamination, as is known to those in the art. Water is lifted via line 10, pump 14 and conduits 16 and 18 to extraction means 20 also referred to herein as contacting means and extraction zone, which may comprise any suitable conventional liquid/liquid extractor such as an agitated vessel, jet mixer, rotary disc contactor, mixer-settler or perforated plate tower. Settling areas may be provided at the top or bottom of the tower or suitable settling chambers may be provided external to the extraction equipment.

As illustrated in the drawing, the supplied water enters the top of extraction zone 20 and the downflowing aqueous phase contacts upflowing solvent which is less dense than water and enters the lower part of the the extraction zone via conduit 22. In extracting the haloorganic-containing water the conditions of extraction may be varied, e.g., temperature, quantity of solvent employed, and the number of contacts between the solvent and water. The extraction may be intermittent or continuous, as best adapted to secure the most efficient and technical results. It is possible to pass the solvent or the disperse phase through the water or to pass the water through the solvent. The extraction may be upflow, downflow, co-current or countercurrent. Centrifugal means (not shown) may be provided for accelerating separation of the phases from either the continuous or multiple extraction systems. Preferably the solvent is flowed upwardly through the water.

The extraction may be carried out at temperatures in the range from about 1° C. to about 50° C., preferably in the range from about 15° C. to about 45 C. Generally the extraction temperature should be above the freezing point of the particular hydrocarbon mixture employed as solvent. Heat energy may be added, when desired (not shown). Subatmospheric, atmospheric or superatmospheric pressures may be applied. For the extraction it is preferred that the solvent contacts the water in a volume ratio of solvent to water in the range from about 0.01:1 to about 10:1, and most preferably in the range from about 0.1:1 to 1:1.

The haloorganic-fat solvent then passes from the extraction zone 20 via conduit 24 for separation of entrained water from the solvent in optional external settler 26. From the upper part of the settler 26 the fat solvent is removed via conduit 28 valves 30 and 32 and conduits 34 and 36 to photodegradation (solvent regeneration) zone shown as two ultraviolet radiation modules 38 and 40 arrayed in parallel flow. The solvent preferably contains some free, i.e., visible water as a second phase to "capture" the photoreleased halides. As will be obvious to those skilled in the art any number of ultraviolet modules can be employed suitable to the desired volume of solvent which must be irradiated to photodegrade the extracted haloorganics therein. The use of individually-valved multiple ultraviolet modules permits individual modules to be taken out of service for maintenance and the like, without disruption of continuous operation.

The solvent is irradiated at a wave length in the range from about 200 to about 400 nm and at the rate of from about 5 to about 50 kilowatts per gram of haloorganic present in the solvent resulting in regenerated, i.e. substantially haloorganic-free, solvent being removed via conduits 42 and 44, and valves 46 and 48 into conduit 50. The regenerated solvent is recycled to the extraction zone 20 via conduit 52 pump 54 and conduits 56 and 22, with or without intermediate storage, as desired. A portion of the solvent may be removed from the system after settler 26 via valve 58 and conduits 60 and 62, and/or after regeneration via valve 64 and conduits 66 and 62 to avoid the build-up of degradation products and or surfactants in the system which might interfere with the process. In order to compensate for such removal and minor solvent losses, if any, through the process, a small amount of solvent may be added along with the recycle solvent via conduit 68 to maintain the desired ratio of solvent to supplied water in the extracting step of the process.

The supplied water, after extraction, passes from the extraction zone 20 via conduit 25 to said optional settler 26 for separation of any entrained solvent. A particular advantage of the solvent in this process comprises mostly of $C_{14}$ and above alkanes is its very low solubility in water. Accordingly, the water having reduced haloorganics content is removed from the bottom of settler 26 via conduit 70, and is passed via pump 72, conduit 74, valve and conduit 76 to the groundwater aquifer. If desired, a portion, or all, of said water may be removed from the system for immediate use or further treatment, such as ultraviolet disinfection, via valve 80 and conduit 82.

Part of the supply means and the extraction means may be in a single structure. For example, in one embodiment, solvent may be supplied to an inlet side of the pump 14 via conduit 56, valve 84 and conduit 86 whereby pump 14 may suffice as the means for contacting, i.e. the extraction zone. In another embodiment said contacting means may comprise a portion of conduit 18. In the latter case solvent is introduced via conduit 56, valve 88 and conduit 73 directly into conduit 18, and a suitable length of conduit 18, alternate conduit 18a, and conduit 24 should then be provided between the solvent introduction point and settling area 26 for separating the solvent, to permit the desired extraction of the haloorganics into the solvent. In this embodiment means for extraction 20 need not be present as a separate structure. If desired, the pump, conduit, and e.g. agitated vessel, if present, may be used as extracting means individually, or in any combination.

The instant process may be applied to soil containing-haloorganics by percolating the solvent through soil, recovering solvent from above the water table and regenerating the solvent as described herein. Any solvent entrained in the soil is readily biodegradable.

The invention will now be further illustrated but is not intended to be limited by the following examples.

EXAMPLE 1

Two pesticidal halooganics, ALDRIN (1,2,3,4,10,10,-Hexachloro-1,4,4a,5,8,8a-hexahydro-1,4-endo-exo-5,8-dimethanonaphthalene) and DBCP (1,2-dibromo-3-chloropropane) were tested for photolysis in a solvent according to the invention, n-Hexadecane, in the presence of an aqueous phase. Fifty-seven ml of a solution of 100 mg/l of ALDRIN in n-Hexadecane was shaken thoroughly for five minutes with a like volume of water in a glass bottle of 120 ml capacity to allow the ALDRIN to reach equilibrium at room temperature (22 C.) between the solvent and the water phase before being exposed to ultraviolet irradiation. A 5 watt Pen-ray ultraviolet light source was connected to the sealed bottle through the cap, the light was inserted into the bottle to a level just above the upper solvent layer and the contents of the bottle were irradiated at 254 nm. During irradiation the liquids were stirred mildly with a magnetic stirring bar, while maintaining two separate phases. Owing to the high initial haloorganic concentration and the low intensity of the ultraviolet source the sample was irradiated for 200 minutes. At intervals during the irradiation, the pH and the chloride ion content of the water phase was determined. Results are shown in Table 1.

TABLE 1

| PHOTODEGRADATION OF ALDRIN IN N—HEXADECANE | | | |
|---|---|---|---|
| Irradiation Time | Chloride in Water | | Final Temperature |
| min. | mg/l | pH | °C. |
| 0 | * | 6.7 | 22 |
| 20 | 5.5 | 4.1 | * |
| 40 | 11.5 | 3.7 | * |
| 80 | 32.0 | * | * |
| 140 | 46.0 | 3.1 | 43 |
| 200 | 52.4 | 3.1 | 45 |

*Not determined

The procedure was repeated using a solution of 100 mg/l of DBCP in n-Hexadecane, except that only 20 ml of said DBCP solution was mixed with 80 ml of water, and the irradiation time was 60 minutes. In addition to the chloride, bromide ion content of the water phase was also determined by Dionex anion chromatography.

TABLE 2

PHOTODEGRADATION OF DBCP IN N—HEXADECANE

| Irradiation Time min. | Halides in water, mg/l | | | Final Temperature °C. |
|---|---|---|---|---|
| | Br— | Cl— | pH | |
| 0 | 0.29 | 0.05 | 6.8 | 22 |
| 30 | 3.2 | 0.44 | 4.7 | 38 |
| 60 | 4.7 | 0.84 | 3.9 | 45 |

Based upon the above, it is estimated that the amount of ultraviolet energy required to dehalogenate 5 ppbw of total haloorganics in 10,000 tons of water would be in the range from about 200–1000 kilowatt hours when the haloorganic was of the chlorocyclodiene type, and from about 1000–3000 kilowatt hours when the haloorganic is a polychloroaliphatic hydrocarbon. Although the temperature of irradiated liquids was raised by the applied irradiation energy, considerably smaller temperature change would be expected in a commercial scale continuous process.

EXAMPLE 2

The procedure of Example 1 is repeated using carbon tetrachloride dissolved in n-Hexadecane containing about 20 ppm of water. Related results are obtained.

What is claimed is:

1. A process for reducing the concentration of haloorganic compounds in water containing-haloorganics selected from the group consists of chlorocyclodiene hydrocarbons, chloroaliphatic hydrocarbons and synthetic pyrethroids which process comprises:
   (a) extracting said water in an extraction zone at a temperature from about 1° C. to about 50° C. with a hydrocarbon solvent consisting essentially of $C_{12}$ to $C_{20}$ alkane hydrocarbons, at least 60% of which are $C_{14}$ and above, said hydrocarbon solvent having a solubility in water of less than about 5 ppbw at the extraction temperature to obtain (1) a fat solvent extract containing said haloorganics, and (2) water having reduced concentration of said haloorganics,
   (b) subjecting said fat solvent extract to ultraviolet radiation in a photodegradation zone in amount of ultraviolet radiation in the range from about 5 to about 50 kilowatts per gram of haloorganic present in the hydrocarbon solvent to photodegrade said haloorganics, resulting in a lean solvent having reduced concentration of haloorganics,
   (c) recycling said lean solvent to the extraction zone of step (a), and
   (d) withdrawing water having reduced concentration of haloorganics from said extraction zone.

2. A process as in claim 1 wherein the extraction temperature is from about 15° C. to about 45° C.

3. A process as in claim 1 wherein said hydrocarbon solvent has a solubility in water of less than about 2 ppbw at the extraction temperature.

4. A process as in claim 1 wherein said hydrocarbon solvent consists essentially of hexadecane.

5. A process as in claim 1 wherein in said photodegradation zone said solvent contains some water as a second phase.

6. A process as in claim 1 wherein said haloorganic compounds are chlorocyclodiene hydrocarbons.

7. A process as in claim 1 wherein said haloorganic compounds are chloroaliphatic hydrocarbons.

8. A process as in claim 1 wherein said haloorganic compounds are polychlorinated cyclic hydrocarbons with endomethylene-bridged structures.

9. A process as in claim 1 wherein said haloorganic compounds are synthetic pyrethroids.

10. A process as in claim 1 wherein the ultraviolet radiation is in the wave length range from about 200 to about 400 nm.

11. A process for reducing the concentration of haloorganic compounds selected from the group consisting of chlorocyclodiene hydrocarbons, chloroaliphatic hydrocarbons and synthetic pyrethroids, in water located in a subsurface water aquifer, which process comprises:
   providing a first well which traverses that portion of said aquifer having water containing said haloorganic compounds, and a second well communicating with said aquifer,
   transporting said water to the surface of the earth to an extraction zone,
   extracting said water in said extraction zone at a temperature from about 1° C. to about 50° C. with a hydrocarbon solvent consisting essentially of $C_{12}$ to $C_{20}$ alkane hydrocarbons at least 60% of which are $C_{14}$ and above, said hydrocarbon solvent having a solubility in water of less than about 5 ppbw at the extraction temperature, to obtain (1) a fat solvent extract containing said haloorganics, and (2) water having reduced concentration of said haloorganics,
   subjecting said fat solvent extract to ultraviolet radiation in a photodegradation zone in an amount of ultraviolet radiation in the range from about 5 to about 50 kilowatts per gram of haloorganics present in the hydrocarbon solvent, to photodegrade said haloorganics, resulting in a lean solvent having reduced concentration of haloorganics,
   recycling said lean solvent to said extraction zone and,
   passing water having reduced concentration of haloorganics from said extraction zone via said second well to said aquifer.

12. A process as in claim 11 wherein said hydrocarbon solvent consists essentially of hexadecanes.

13. Apparatus for reducing the concentration of haloorganic compounds in water-containing haloorganic compounds which comprises,
   (a) means for supplying water contaminated with haloorganic compounds,
   (b) means for extracting said supplied water with a water immiscible alkane solvent, said means for extracting having a fluid connection to said means for supplying water, a fluid solvent inlet, and at least one fluid outlet for extracted water and/or solvent,
   (c) means for regenerating solvent by irradiation from an ultra-violet radiation source to photodegrade the haloorganic compounds in the solvent, said means for regenerating having an inlet in fluid communication with said means for extracting, and an outlet, and
   (d) means for recirculating solvent, operatively connected to the outlet of said means for regenerating solvent to circulate solvent from said means for regenerating to said means for extracting.

* * * * *